March 16, 1937. L. BÉCHEREAU 2,074,201
AIRFOIL USED IN AERONAUTICS
Filed Jan. 25, 1935 5 Sheets-Sheet 1
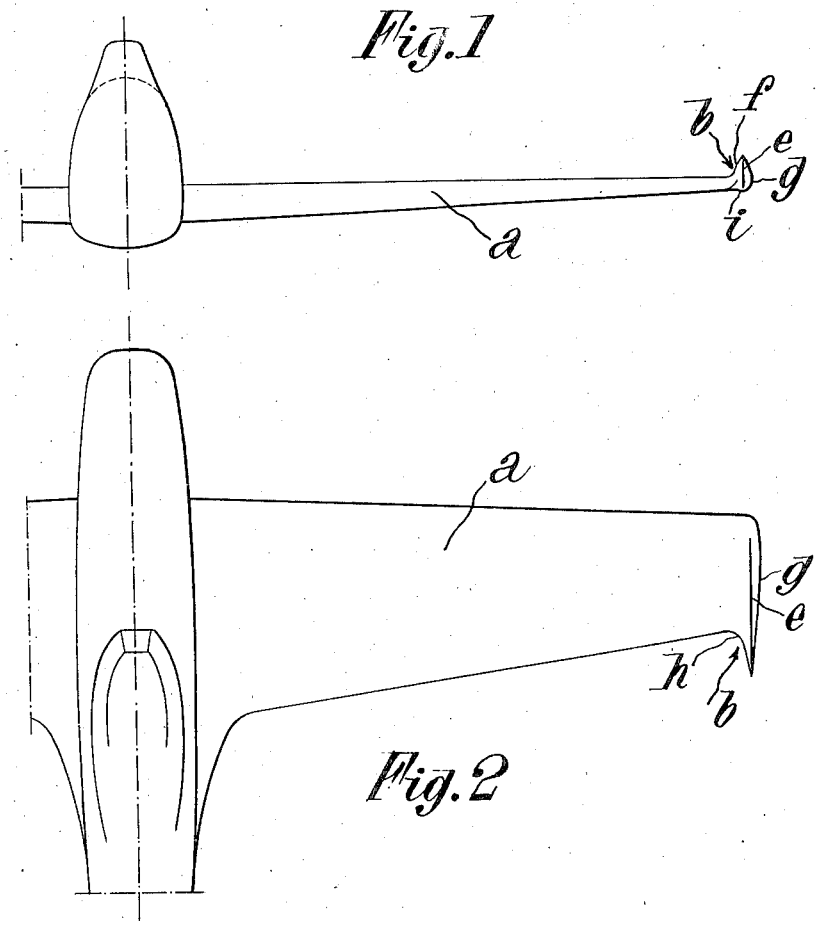
Inventor:
Louis Béchereau
Attorneys March 16, 1937.  L. BÉCHEREAU  2,074,201
AIRFOIL USED IN AERONAUTICS
Filed Jan. 25, 1935  5 Sheets-Sheet 2
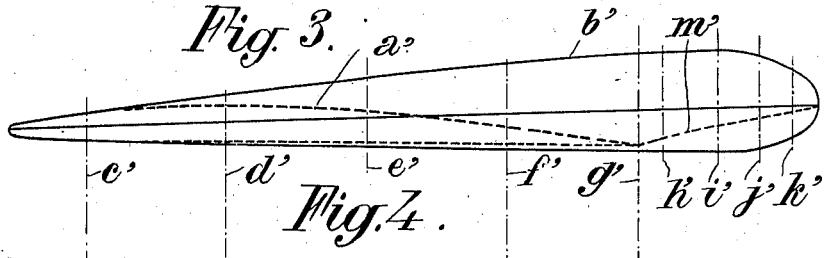
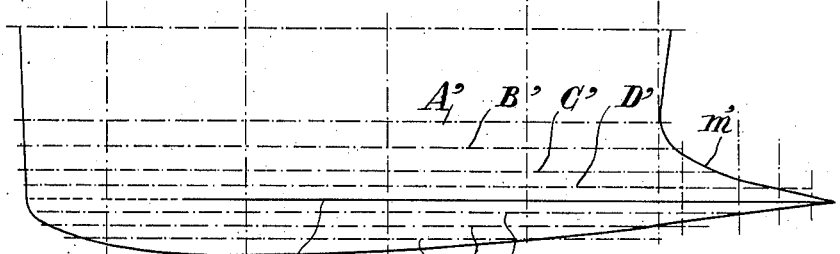
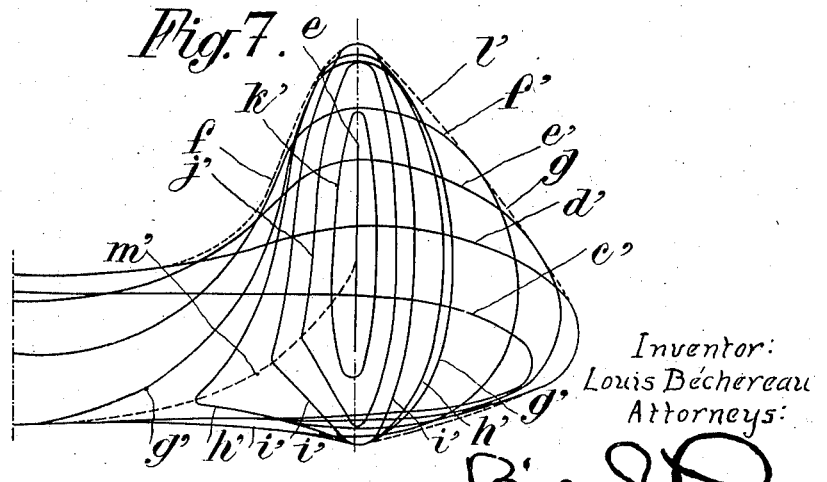
Inventor:
Louis Béchereau
Attorneys:

March 16, 1937.  L. BÉCHEREAU  2,074,201
AIRFOIL USED IN AERONAUTICS
Filed Jan. 25, 1935   5 Sheets-Sheet 3

Inventor:
Louis Béchereau
Attorneys:

March 16, 1937.    L. BÉCHEREAU    2,074,201
AIRFOIL USED IN AERONAUTICS
Filed Jan. 25, 1935    5 Sheets-Sheet 4

Inventor:
Louis Béchereau
Attorneys:

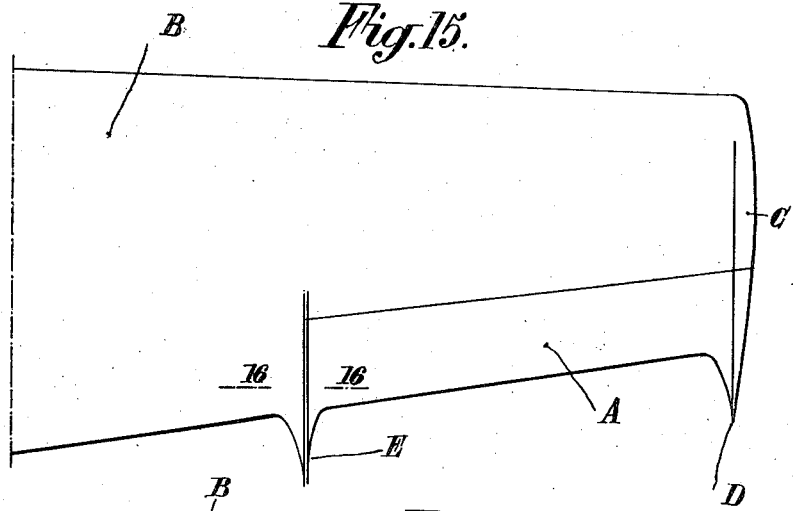
Fig. 15.
Fig. 16.
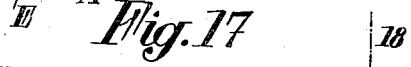
Fig. 17.
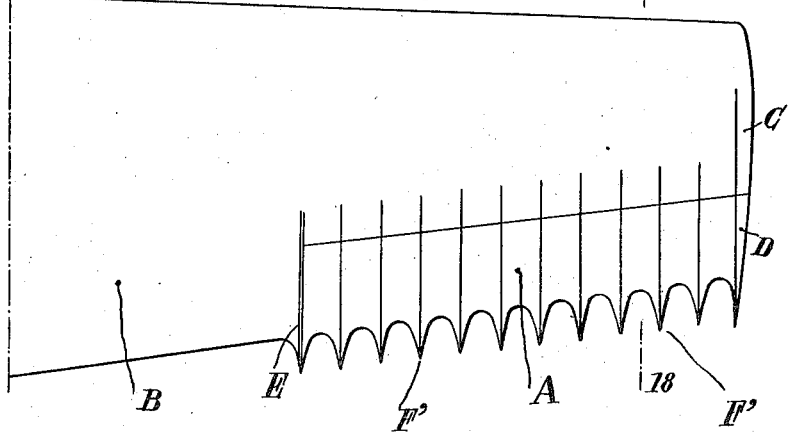
Fig. 18.
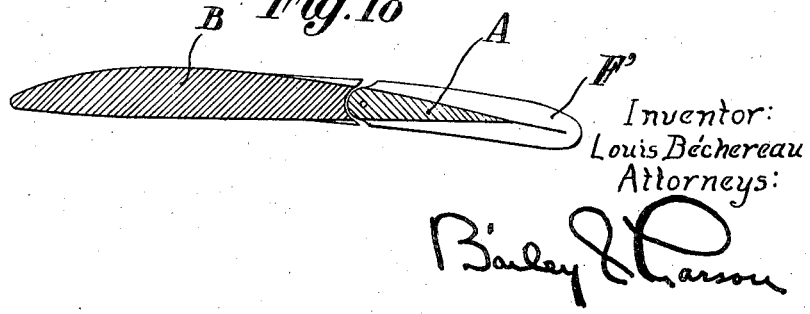
Inventor:
Louis Béchereau
Attorneys:

Patented Mar. 16, 1937

2,074,201

UNITED STATES PATENT OFFICE 2,074,201

AIRFOIL USED IN AERONAUTICS

Louis Béchereau, Paris, France, assignor to Society Avions Kellner-Béchereau, Billancourt, France, a corporation of France Application January 25, 1935, Serial No. 3,504
In France January 29, 1934

5 Claims. (Cl. 244—91)

The present invention relates to airfoils, such for instance as wings, used in aeronautics.

The object of the present invention is to improve the aerodynamic characteristics of these airfoils while attenuating the effects of eddying, which, when allowed to develop abnormally, gives rise to a drop of efficiency, vibrations, especially of the ailerons or like parts, and disturbance of the flow of air, resulting in a loss of speed.

The essential feature of the present invention consists in providing at least one bulge projecting from the surface of the airfoil at a place where an eddying flow of air is to be feared, said bulge being adapted to reduce eddying by controlling the flow of air in the vicinity thereof. This bulge, the cross section of which (in a direction at right angles to the flow of air) is substantially elliptical, merges in the airfoil and is limited by a streamline covering joined to the surface of said airfoil. Advantageously, it forms, at its rear end, a kind of fin, preferably at right angles to the wing or airfoil.

Other characteristic features of the present invention will result from the following detailed description of some embodiments thereof.

Preferred embodiments of the present invention will be hereinafter described with reference to the accompanying drawings, given merely by way of example, and in which:

Fig. 1 is an elevational end view of a portion of the wing of an airplane made according to the present invention;

Fig. 2 is a plan view corresponding to Fig. 1;

Fig. 3 is a side view of the end of a wing, according to a modification;

Fig. 4 is a corresponding plan view;

Fig. 5 is a lateral view from the fuselage showing sections made along the lines shown by Fig. 4;

Fig. 6 is a corresponding side view showing the shape of sections made along the lines of Fig. 4;

Fig. 7 is a corresponding front elevational view showing the shape of sections made along the lines of Fig. 4;

Fig. 15 is a plan view of the end of a wing provided with an aileron made according to the present invention;

Fig. 16 is a sectional view on the line 16—16 of Fig. 15;

Fig. 17 is a plan view of the end of an airplane wing provided with an aileron, made according to the invention;

Fig. 18 is a sectional view on the line 18—18 of Fig. 17.

Figure 8:
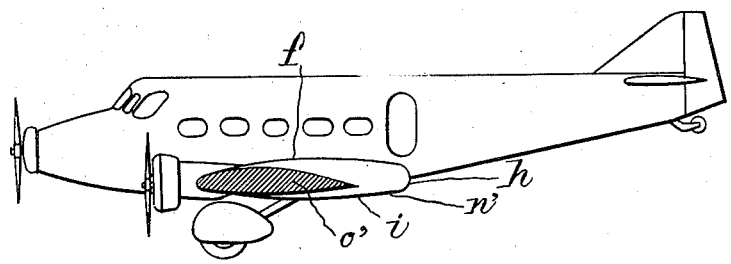
Fig. 8 is a side elevational view of a multi-engined airplane provided with wings according to the present invention.

The airfoils with which the present invention deals may be either supporting surfaces or stabilizing surfaces. These surfaces are made in the conventional or any other suitable manner with the exception of places where there is a risk of an eddying flow of air. In the following description, certain portions of the airfoils of an airplane, and especially the tips of the wings and the portions thereof in the vicinity of the trailing edge will be more specifically mentioned, but the invention should not be considered as limited to these particular arrangements. In view of the fact that the bulge which is the essential characteristic of the present invention is of limited cross section, so as not to unduly limit the head resistance, and which therefore can only influence a limited portion of the wing, it will be more advantageous to limit the number of these bulges rather than give them exaggerate dimensions.

These bulges or deformations of the wing are made of a shape approximating as much as possible the shapes they would be given if they were to be joined to fuselages with which they would be combined, that is to say a shape similar to that of "Karmann" nacelles. In order to determine this shape, in each specific case to be considered, it is advantageous to proceed as follows: It is assumed that there is established, at the point that is considered, a partition of suitable dimension which is generally disposed in a plane at right angles to the airfoil and which is considered as being a part of the wall of a fictive fuselage. At a certain distance from this wall, the outline of the wing is elongated toward the rear and at the same time its incidence is progressively reduced or increased, as the case may be.

In particular in the case of main supporting wings and if it is desired to improve the flow of air on either side of the wings, this incidence diminishes gradually as these profiles are more and more elongated. If it is desired to improve the flow of air in an intermediate portion of the wing, this incidence increases gradually so as to prolong the effect of the normal part of the wing. In the case of stabilizing surfaces, such for instance as the horizontal surfaces of the tail which have symmetrical profiles, these profiles remain advantageously symmetrical in their elongated portion.

The faces of the profile of the wing or airfoil are then joined to the corresponding edges of the wall above referred to through suitable curved surfaces. In the case of an end wall or partition, the face thereof opposed to that which is joined to the wing is advantageously given a rounded bulging or aerodynamic shape.

I thus obtain, at the place of the wing that is to be improved, a kind of aerodynamic bulge consisting of a streamline covering, forming a "wing deflector" and joining one or two cross sections of the wing to a wall at right angles to said wing (or substantially so) and transversely to the direction thereof, said wall being provided either at the end of the wing or at an intermediate point of the rear edge thereof.

The air streams which eddy along the adjacent portions of the wing thus modified are gradually deflected, through a phenomenon analogous to that produced by the wake of a ship, onto walls without incidence along which they can flow in a smoother manner than previously.

These explanations will be easier to understand when considered with reference to the embodiments shown by the drawings.

In the example of Figs. 1 and 2, an airplane wing $a$ is to be provided at its end with a bulge $b$ as above explained. This bulge includes a wall $e$ at right angles (or oblique) to the general plane of the wing. This wall is not visible because it is surrounded, on all sides, with rounded or curved surfaces the whole of which forms the bulge in question. On the side that is adjacent to the wing, these curved surfaces serve to join the adjacent part of the wing to the corresponding edges of the wall $e$. The outline of the surface that joins the upper face of the wing to the upper edge of walls $e$ (Fig. 1) is designated by reference character $f$. The outline of the curved surface that joins the under face of the wing to the lower edge of wall $e$ (Fig. 1) is designated by reference character $i$. The curved surface that joins the trailing edge of the wing with the rear part of the bulge, forming a kind of fin (Fig. 2) is designated by reference character $h$. Finally, the rounded surface that covers the outer face of wall $e$ (opposed to that which is joined to the wing) is designated by reference character $g$.

Of course, the invention is not limited to this shape of the bulge and the dimensions and shapes of the curved and rounded surfaces may be modified according to the circumstances.

For instance I have shown in Figs. 3 to 7 a bulge of different shape. Wall $e$ (Fig. 4) is substantially at right angles to the wing profile $a'$, the upper edge of this wall being designated by reference character $b'$ in Fig. 3. Figs. 3 and 4 show a certain number of longitudinal sectional lines $c'$, $d'$, $e'$, $f'$, $g'$, $h'$, $i'$, $j'$, and $k'$ and also a certain number of transverse sectional lines $A'$, $B'$, $C'$, $E'$, $F'$, and $G'$, the corresponding sections being designated by the corresponding reference characters in Figs. 5, 6 and 7. Fig. 7 also shows, in dotted lines, the outlines of curves $f$ and $i$ and also of the outer curved surface $g$, which constitute the envelops of the various curves shown in this Fig. 7.

Figure 9:
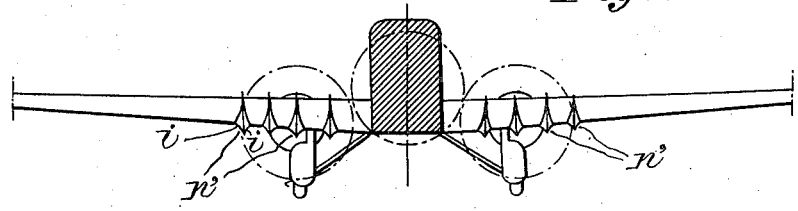
Fig. 9 is a rear view corresponding to Fig. 8 of the same airplane.
Figure 10:
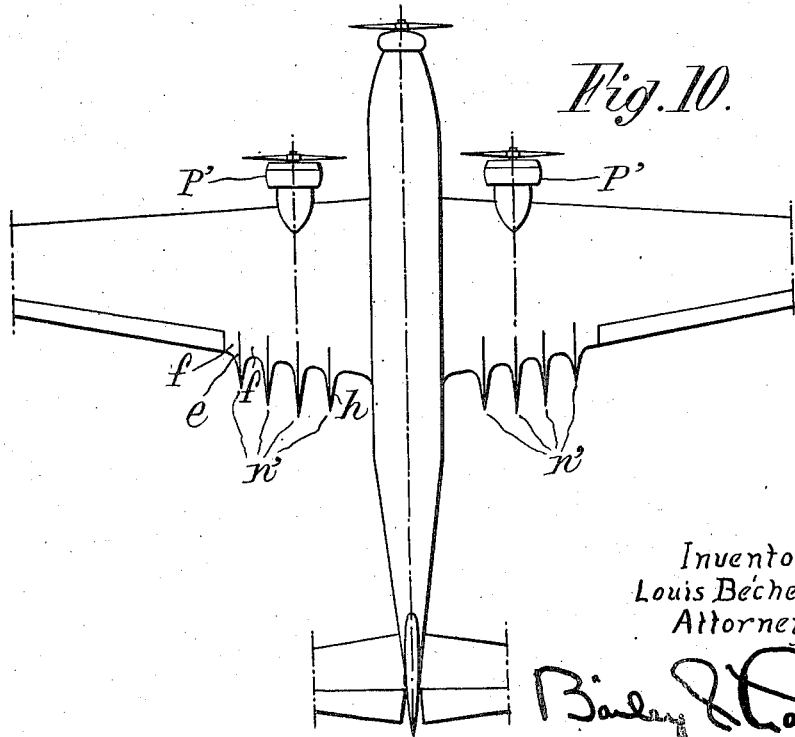
Fig. 10 is a corresponding plan view.
Figure 11:
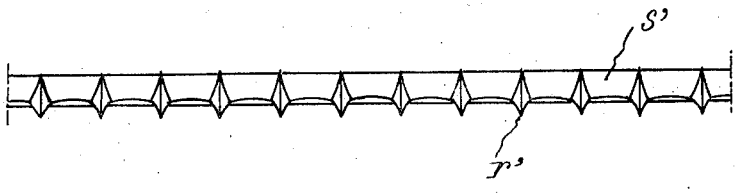
Fig. 11 is a rear view of a portion of a wing the trailing edge of which is made according to the invention.
Figure 12:
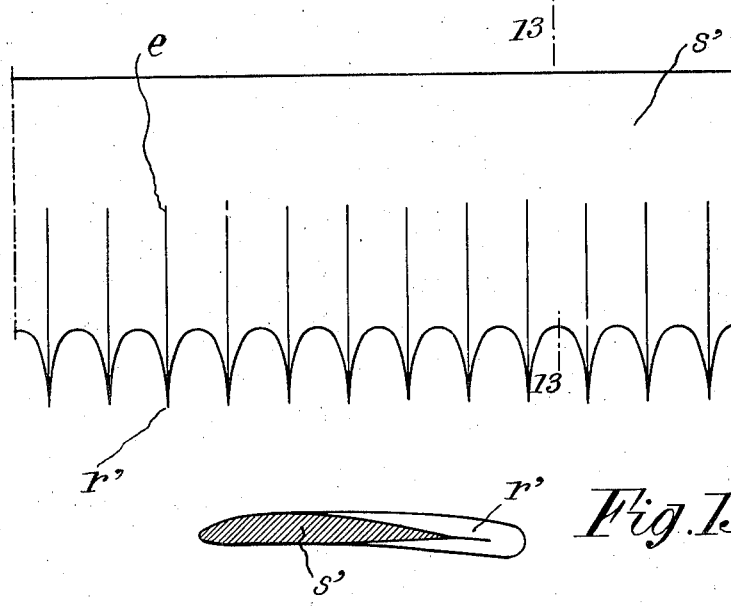
Fig. 12 is a plan view corresponding to Fig. 11.
Figure 13:
Fig. 13 is a sectional view on the line 13—13 of Fig. 12.
Figure 14:
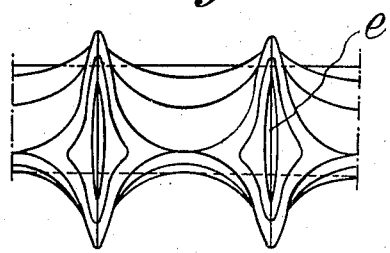
Fig. 14 is a rear view, on an enlarged scale, of the trailing edge of the same wing.

In Figs. 8 and 9 I have shown a multi-engined airplane with its main supporting wing $o'$, the trailing edge of which is provided, behind the outer engines, with deflecting parts, or bulges $n'$, made in substantially the same manner as above explained. These bulges include a vertical wall or edge $e$, substantially at right angles to the general plane of the wing and which is joined to the wing surface through curved surfaces $f$ and $i$. These bulges extend toward the rear beyond the trailing edge of the wing so as to form each a kind of fin $h$ (Fig. 10).

In Figs. 11 to 14 I have illustrated an embodiment in which a plurality of bulges $r'$, of the same kind as those above described, are distributed, either at regular or irregular intervals, over the whole or a part of the trailing edge of wing $s'$.

Figs. 15 and 16 show the end portion of a wing B provided with an aileron A intended to pivot with respect to the wing. This aileron is provided, at its end, with a bulge D analogous to those above described with reference to Figs. 1 to 7 and which is advantageously joined to a stationary bulge C, of corresponding shape, provided at the end of the fixed part of the wing.

Another bulge E may be provided at the place where the aileron and the wing are adjacent to each other. This last mentioned bulge is of the type of those shown by Figs. 8 to 14 but it is provided partly on the wing B and partly on the aileron A, the wall E of the bulge being, in this case, materialized by the adjacent walls of wing B and aileron A.

Figs. 17 and 18 relate to a similar arrangement, but in this case the trailing edge of the aileron has been provided with a plurality of bulges of the kind disclosed by Figs. 8 to 14. These bulges are provided either along the whole of the trailing edge of the aileron or only along a portion of said edge. In the example shown in the drawing they are disposed at equal intervals from one another, but this is not a necessary condition.

The airfoils, wings, rudders, stabilizing planes, etc., made according to the present invention as above described possess the advantages stated at the beginning of this description and, in particular, they eliminate, or at least greatly reduce, the effects of eddying flow of air on the wings.

While I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. In a multi-engined airplane, a wing including, on its front edge, at least one engine and, in its rear part, a plurality of bulges disposed side by side in line with said engine, each of said bulges being of streamline form, being joined by curved surfaces to the surface of the wing, and extending in the fore-and-aft direction of the airplane beyond the trailing edge of the wing.

2. An airplane wing including an integral substantially rigid bulge arranged so that its plane of maximum cross section is disposed substantially perpendicular to the wing and transversely thereof, said bulge projecting from the upper and lower face of said wing and having continuously curved surfaces gradually merging into said wing, said bulge extending toward the rear beyond the trailing edge of said wing.

3. An airplane wing including an integral substantially rigid bulge at its outer end for eliminating an eddying flow of air around said end, said bulge being arranged so that its plane of maximum cross section is disposed substantially perpendicular to the wing and transversely thereof, said bulge extending substantially in fore and aft direction of the airplane and including a portion extending toward the rear beyond the trailing edge of said wing in a streamline manner, the surfaces of said bulge and said extending portion being continuously curved and gradually merging into said wing, the curved surface at the point of juncture of the side of the bulge and the wing being concave.

4. An airplane wing including an integral substantially rigid bulge at its outer end for eliminating an eddying flow of air around said end, said bulge being arranged so that its plane of maximum cross section is disposed substantially perpendicular to the wing and transversely thereof, said bulge extending substantially in fore and aft direction of the airplane and including a portion extending toward the rear beyond the trailing edge of said wing in a streamline manner, the surfaces of said bulge and said extending portion being continuously curved and gradually merging into said wing, the curved surface at the point of juncture of the side of the bulge and the wing being concave, the free side of said bulge being curved convexly.

5. An airplane wing including an integral substantially rigid bulge at its outer end for eliminating an eddying flow of air around said end, said bulge being arranged so that its plane of maximum cross section is disposed substantially perpendicular to the wing and transversely thereof, said bulge extending substantially in fore and aft direction of the airplane and including a portion extending toward the rear beyond the trailing edge of said wing in a streamline manner, the surfaces of said bulge and said extending portion being continuously curved and gradually merging into said wing, the curved surface at the point of juncture of the side of the bulge and the wing being concave, the free side of said bulge being curved convexly, the curved surfaces connecting the tip of the rear portion and the trailing edge of the wing being substantially concave.

LOUIS BÉCHEREAU.